(12) United States Patent
Hessman

(10) Patent No.: US 7,547,164 B2
(45) Date of Patent: Jun. 16, 2009

(54) FACE MILLING INSERT

(75) Inventor: Ingemar Hessman, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/802,081

(22) Filed: May 18, 2007

(65) Prior Publication Data

US 2007/0297865 A1    Dec. 27, 2007

(30) Foreign Application Priority Data

Jun. 27, 2006   (SE) .................................. 0601402

(51) Int. Cl.
*B23B 27/00*   (2006.01)
*B23B 29/00*   (2006.01)

(52) U.S. Cl. ........................................ 407/113; 407/66

(58) Field of Classification Search ......... 407/113–116, 407/66, 67, 30, 33
See application file for complete search history.

(56) References Cited

U.S. PATENT DOCUMENTS 5,634,745 A * 6/1997 Wiman et al. ............... 407/113
5,904,450 A   5/1999 Satran et al.
7,008,148 B2 * 3/2006 Wiman et al. ............... 407/113
7,118,312 B2 * 10/2006 Norstrom et al. ............ 407/113
7,232,279 B2 * 6/2007 Smilovici et al. ........... 407/113

FOREIGN PATENT DOCUMENTS

EP   1 093 874 A1   4/2001
EP   1 297 921 A1   4/2003
WO   WO 00/47405    8/2000

* cited by examiner

*Primary Examiner*—Willmon Fridie
(74) *Attorney, Agent, or Firm*—Drinker Biddle & Reath LLP

(57) ABSTRACT

A face-milling insert, including a chip-removing main cutting edge adjacent to a first clearance surface, and a surface-wiping secondary edge adjacent to a second clearance surface, the main cutting edge forming an angle of 45° with an imaginary straight line in the extension of the secondary edge. Adjacent to a third clearance surface, an intermediate cutting edge is formed between the main cutting edge and the secondary edge, the intermediate cutting edge being shorter than the main cutting edge and forming an angle within a range of 20-40° with the extension line. The intermediate cutting edge transforms into the adjacent edges via arched part edges adjacent to convex clearance surfaces.

6 Claims, 4 Drawing Sheets

FACE MILLING INSERT

This application claims priority under 35 U.S.C. § 119 to Sweden Patent Application No. 0601402-1, filed on Jun. 27, 2006, the disclosure of which is incorporated by reference herein in its entirety.

FIELD OF THE INVENTION

The present invention relates generally to a face-milling insert of the type that includes a chip-removing main cutting edge adjacent to a first clearance surface, and a surface-wiping secondary edge adjacent to a second clearance surface, the main cutting edge forming an angle of 45° with an imaginary straight line in the extension of the secondary edge.

BACKGROUND OF THE INVENTION

For chip-removing face machining of metallic blanks or workpieces, e.g., engine-block blanks, face mills are used, which have diameters in a range of 80 mm to 700 mm, and which are equipped with replaceable milling inserts in a number that varies from 10 to over 100. A since long used milling insert for such milling cutter tools has a triangular basic shape, and is indexable as well as invertable by including two opposite, planar and mutually parallel support surfaces, as well as two usually endless, peripheral edge lines, which are countersunk in relation to the support surfaces, each one of which includes six chip-removing main cutting edges (two along each triangle side) and six surface-wiping secondary edges or wiper edges (adjacent to the corners). During operation, only one pair of edges co-operates, viz. one main cutting edge and one secondary edge, which are indexed forward to a position in which the secondary edge is located in an imaginary plane perpendicular to the rotation axis of the mill, at the same time as the main cutting edge is located at an angle (i.e. setting angle) of 45° to the plane. When the milling inserts are used in one and the same mill, e.g., a clockwise rotatable mill, three pairs of edges may be utilized on one side of the milling insert and three pairs of edges on the opposite the side, i.e., in total six pairs of edges. Furthermore, economical users may be even utilize all twelve pairs of edges, namely if the milling insert is moved to a mill that rotates in an opposite direction of rotation (counter-clockwise). In the tool, the individual milling insert is mounted with negative axial and radial angles in order to ensure the requisite clearances.

Previously, engine blocks were made from grey cast iron and were face machined by face mills, the milling inserts of which were distinguished in that the individual, straight main cutting edge transformed into a likewise straight, surface-wiping secondary edge via a corner, which, even if the same was not perfectly sharp, still was distinct by having at most one diminutive radius. However, such milling inserts involved problems originating in the scale- or flake-like structure of the grey cast iron, and which manifested themselves in so-called edge breakouts. Damages of this type could arise when the rim of milling inserts along the periphery of the mill approached the concluding end edge of the work surface. In particular, if the flakes of the material structure were disadvantageously oriented, the remaining edge piece could be broken loose from the rest of the material. In many cases, such edge breakouts led to the blank having to be discarded.

The above-mentioned problems were solved by a modification of the geometry of the milling inserts. More precisely, the secondary edge was given an arc-shape instead of a straight shape, so far that the planar clearance surface adjacent to the main cutting edge was allowed to transform into a convex clearance surface having a comparatively small radius adjacent to the secondary edge. Such pairs of edges generated a chip that was essentially equally thick along the part separated by the main cutting edge, but that became successively thinner and thinner along the part separated by the arched secondary edge. By this modification, the component forces directed against the remaining edge piece of the blank were redistributed so that the resultant force acted more downwardly than laterally. In particular, if the lateral component forces are great in relation to the downward directed forces, such great stresses are applied to the edge piece that it is torn loose laterally, in particular when the scale structure is inappropriately oriented.

In this connection, round or arched cutting edges generally produce more heat than straight edges. The simple reason therefor is that a straight edge has a minimal length for a given cutting depth and a given setting angle, and therefore separates a chip having a minimal width, while an arched edge, for the same cutting depth and having the same setting angle, is longer and separates a wider chip.

Recently, a new iron material has been developed, which is denominated CGI (Compacted Graphite Iron) and which has gained popularity for, among other things, the manufacture of engine blocks. Contrary to the oriented scale or the flake structure of grey cast iron, the structure of CGI is indifferent or coral-like, i.e., it lacks certain orientation. However, attempts to face mill workpieces of CGI by the milling inserts having round or arched secondary edges, which have been successful for the grey cast iron, have not turned out well. Among other things, for reasons difficult to understand, burr formation has occurred adjacent to the edge line along the generated surface where the mill exits.

SUMMARY OF THE INVENTION

The present invention aims at obviating the above-mentioned shortcomings of previously known face-milling inserts, and at providing an improved face-milling insert. Therefore, a primary object of the invention is to provide a face-milling insert that does not give rise to burr formation in the machining of blanks of CGI. An additional object is to provide a face-milling insert that provides a good surface finish of the generated surface, and that furthermore has a long service life and ensures efficient chip removal.

In an embodiment, the invention provides a face-milling insert, including a chip-removing main cutting edge adjacent to a first clearance surface and a surface-wiping secondary edge adjacent to a second clearance surface, the main cutting edge forming an angle of 45° with an imaginary straight line in the extension of the secondary edge. Adjacent to a third clearance surface, an intermediate cutting edge is formed between the main cutting edge and the secondary edge, the intermediate cutting edge being shorter than the main cutting edge, and forming an angle smaller than 45° with the extension line, the intermediate cutting edge transforming into the adjacent edges via first and second arched part edges adjacent to convex clearance surfaces.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
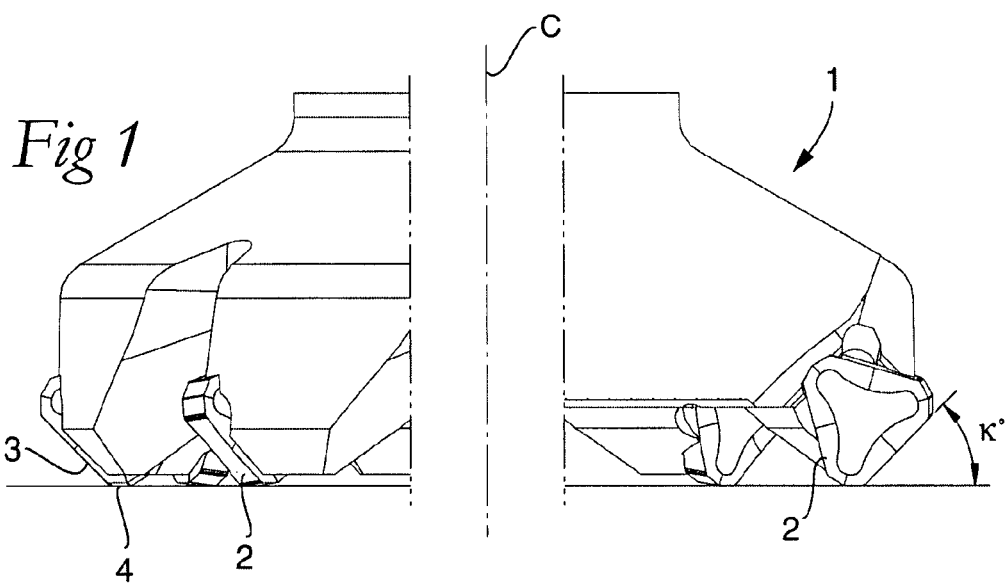
FIG. 1 is a partially cut side view of a face mill including a rotatable basic body (milling cutter head), as well as a number of replaceable milling inserts.
Figure 2:
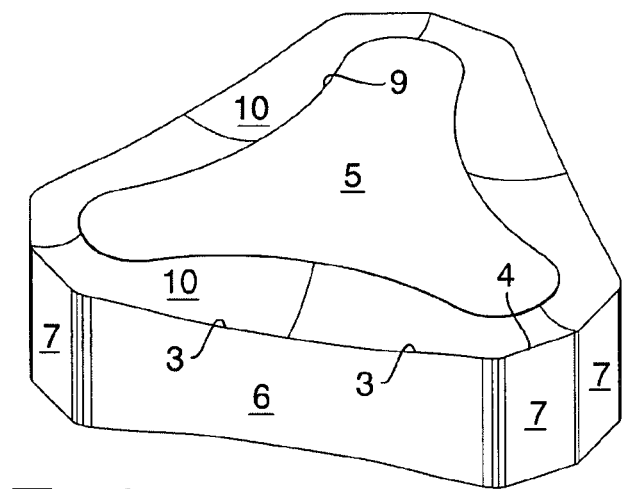
FIG. 2 is a top side view of a milling insert according to an embodiment of the invention.
Figure 3:
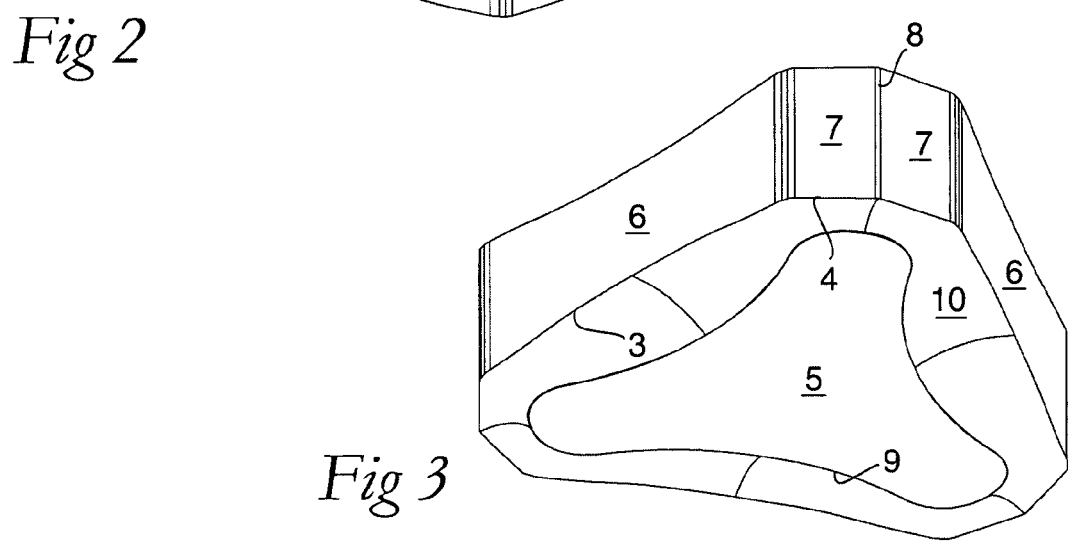
FIG. 3 is a bottom side view of the milling insert of FIG. 2.

In FIG. 1, numeral 1 designates a basic body in the form of a milling cutter head, which is rotatable around a center axis designated C. Depending on the diameter of the mill, a varying number of milling inserts 2 are arranged along the periphery of the basic body, which inserts, in this case, have a triangular basic shape. In each such milling insert, main cutting edges 3 and surface-wiping secondary edges or wiper edges 4 are included. All active secondary edges 4 are situated in a common plane P, which extends perpendicularly to the center axis C. The setting angle κ between each main cutting edge 3 and the plane P amounts to 45°. When the mill, during operation, is moved rectilinearly at the same time that it rotates, the main cutting edges 3 will, in a traditional way, remove chips from the blank being machined, while the secondary edges 4 smooth down or wipe off the generated surface.

Reference is now made to FIGS. 2-8, which in detail illustrate the nature of the milling insert 2 according to the invention. In general, the milling insert is indexable as well as invertable by including a topside and an underside 5 of identical shape and by including three identical triangle corners. Along each triangle side, there are two main cutting edges 3 adjacent to the topside as well as the underside. Each such main cutting edge co-operates with a secondary edge 4, each pair of edges 3, 4 forming an active cutting edge. A first clearance surface 6 is adjacent to the individual main cutting edge 3, while a second clearance surface 7 is adjacent to each secondary edge 4.

Figure 4:
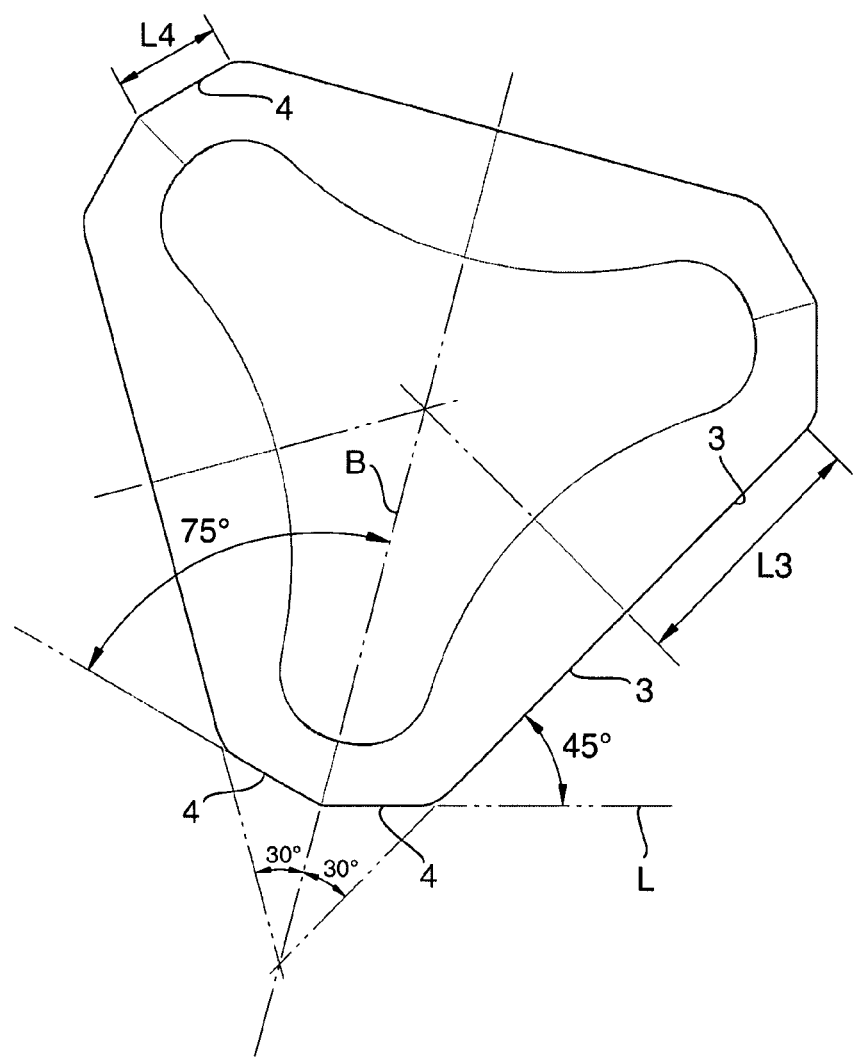
FIG. 4 is a plan view of the milling insert.
Figure 5:
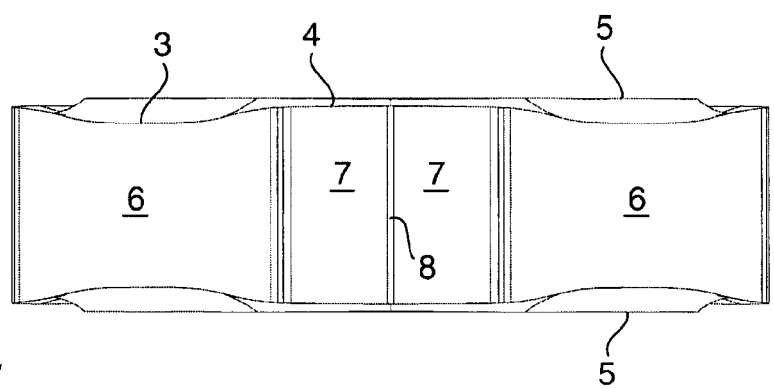
FIG. 5 is a side view of the milling insert.

In FIG. 4, B designates one of three bisectors that intersect and define the three corners of the milling insert. The main cutting edge 3 extends at an angle of 30° to the bisector B, while the angle between the secondary edge 4 and the bisector B is 75°. Therefore, the angle between the main cutting edge 3 and a straight line designated L in the extension of the secondary edge 4, is 45° (i.e. the setting angle κ).

Furthermore, adjacent second clearance surfaces 7 are spaced-apart by a radius transition 8 that is intersected by the bisector B. Furthermore, the topside and the underside 5 of the milling insert are planar surfaces, which are mutually parallel and have an extension that is smaller than the outer contour determined by the clearance surfaces 6, 7. Between the trident-shaped borderline 9 (see FIG. 2), which delimits the individual surface 5, and the periphery, there is an essentially continuous chip surface 10, which generally has a concavely arched shape. In this case, the different edges 3, 4 are included in a continuous or endless edge line, which is countersunk in relation to the individual surface 5, as clearly illustrated in FIG. 5. As such, the individual surface 5 can be utilized as a support surface without damaging the inactive edge line.

Each individual main cutting edge 3 has a straight shape as viewed in a plan view from above, but is slightly arched as viewed laterally. More precisely, the individual main cutting edge 3 falls away in the direction from the corner portion of the milling insert toward the center of the triangle side. The individual secondary edge 4 is generally straight as viewed from above as well as laterally. However, the secondary edge 4 also may have a very weak arc-shape as viewed from above, viz. by the fact that the clearance surface 7 may be very slightly arched. However, this possible arc-shape of the secondary edge 4 is so diminutive that it is not seen by the eye alone. Thus, in practice, the arch may have a radius of 50 mm or more.

Figure 6:
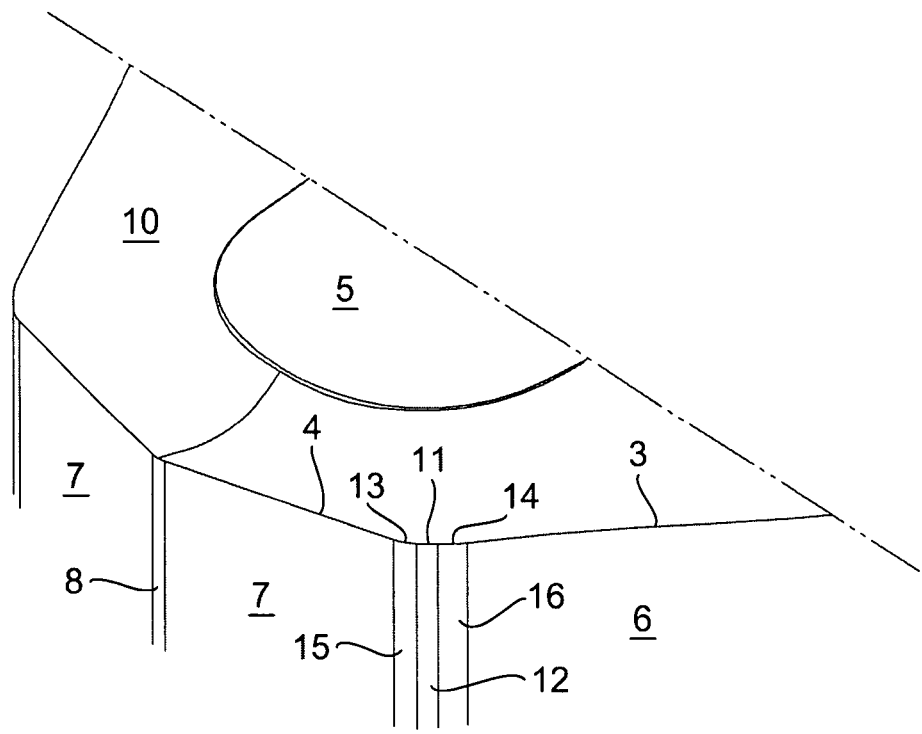
FIG. 6 is a partial, enlarged perspective view showing one active cutting edge of the milling insert.
Figure 7:
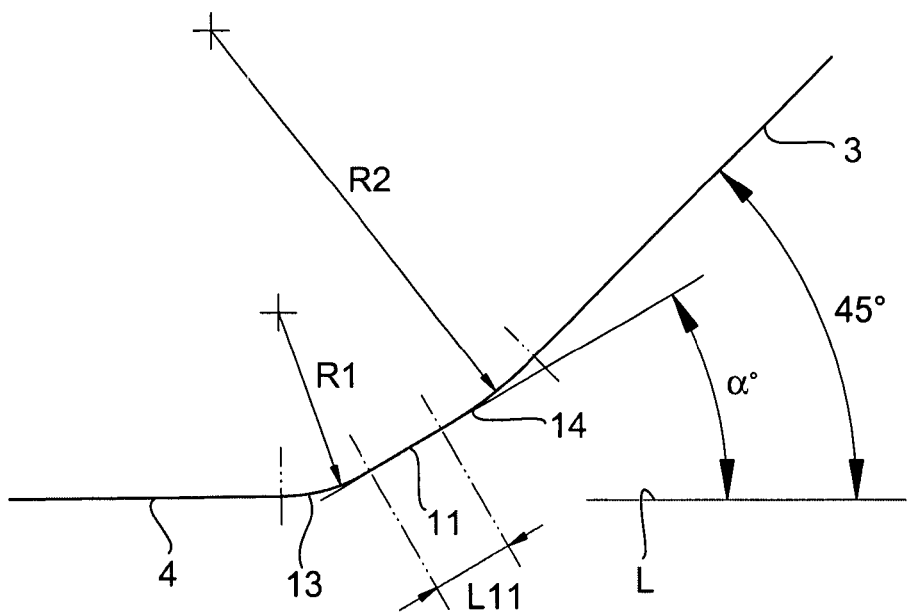
FIG. 7 is a partial, enlarged plan view showing the geometry of the active cutting edge.
Figure 8:
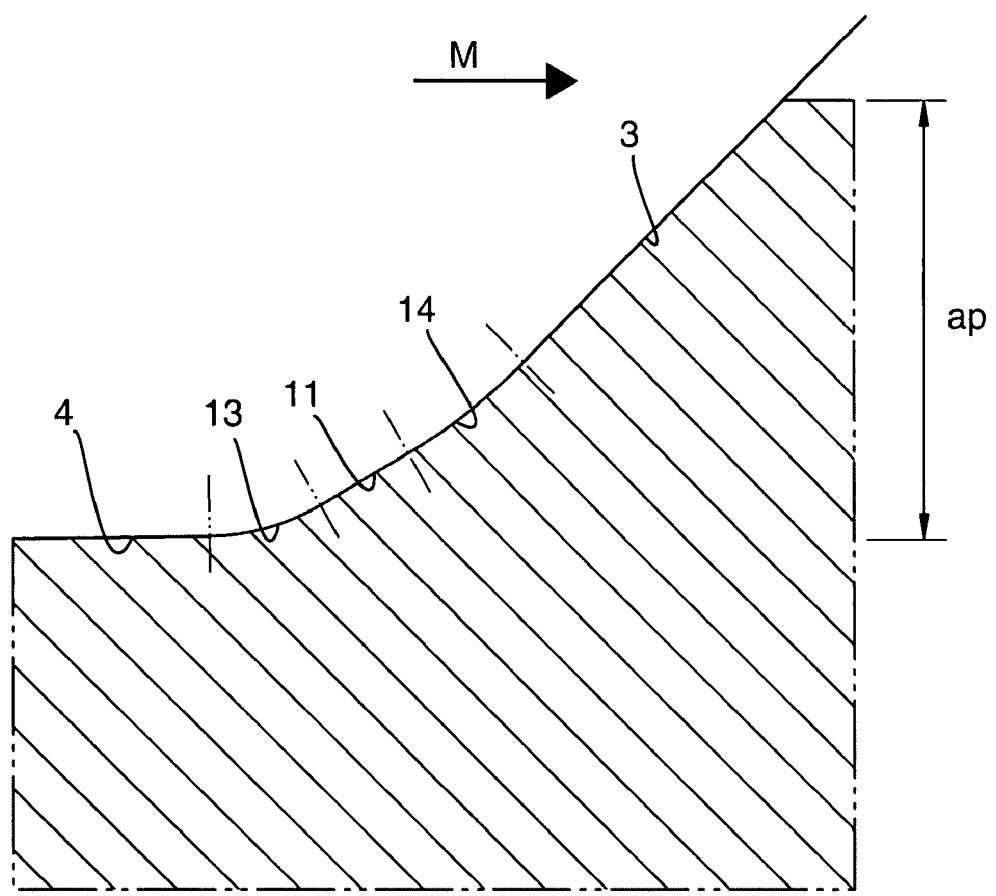
FIG. 8 is a section showing the cutting edge during the removal of chips from a blank.

With reference to FIGS. 6-8, adjacent to a third clearance surface 12, an intermediate cutting edge 11 is formed between the main cutting edge 3 and the secondary edge 4. The intermediate cutting edge 11 forms an angle α being smaller than 45° with the extension line L. More precisely, the angle α should be at least 20° and at most 40°. Most preferably, the angle falls within the range of 25-35°. In the example, α is 30°. Suitably, the intermediate cutting edge 11 is straight so far that the connecting clearance surface 12 is planar. The intermediate cutting edge 11 transforms into the adjacent edges 3, 4 via arched part edges 13, 14 adjacent to fourth and fifth clearance surfaces 15, 16, which both are convex. Among the arched part edges, the part edge 13 situated between the secondary edge 4 and the intermediate cutting edge 11 has a radius R1 that is smaller than the radius R2 of the other part edge 14. In practice, R1 should be at most half as large as R2, and be at most 1 mm, while the radius R2 should be at most 2 mm.

The length L11 of the intermediate cutting edge 11 is considerably smaller than the length L3 of the main cutting edge 3 as well as the length L4 of the secondary edge 4. In practice, the length L11 of the intermediate cutting edge 11 should not exceed 10% of the length L3 of the main cutting edge 3. Advantageously, L3 may be 20 to 40 times greater than L11.

In an actual embodiment in which the milling insert has the IC measure of 12.7 mm, L3 is 5.6 mm and L11 is 0.18 mm. (L11 should not exceed 0.5 mm). If the angle α is 30°, then R1 is 0.4 mm, while R2 is 1 mm. In this connection, the choice of the radius of curvature R1 of the part edge 13 is more important than the choice of the radius of curvature R2 of the part edge 14. In order to minimize the risk of burr formation, the radius R1 should, as has been pointed out previously, not exceed 1 mm. However, in practice, R1 should be distinctly smaller and advantageously be within the range of 0.2-0.6 mm. The choice of the arc radius R2 of the part edge 14 is of less importance provided that R2 is greater than R1.

Reference is made to FIG. 8, which shows an active cutting edge in engagement with a workpiece, the feeding direction of the mill being indicated by the arrow M and the cutting depth being designated "ap". The main part of the chip is separated along the main cutting edge 3 and the edges 14, 11, and is terminated or delimited by the smallest, arched part edge 13, a planar surface being generated in the blank by the planing or surface-wiping effect exerted by the secondary edge 4.

Tests performed have shown that the described milling insert has a good ability to machine CGI without giving rise to burr formation adjacent to the borderline where the milling insert leaves the generated surface. One of several reasons therefor should be that the heat release during the chip removal is kept on a low level, because the cutting edge has a relatively short extension (in comparison with round nose edges) in the engagement thereof with the blank. Furthermore, the component forces that affect a remaining edge piece by the intermediate cutting edge 11 are directed more downward than if the steeper leaning main cutting edge 3 would conclude the milling operation. Even if the intermediate cutting edge 11 is comparatively short, this "turning down" of the component forces is attained precisely where this is important, viz. just before the cutting edge is to leave the blank.

The invention is not limited to face-milling inserts having a triangular basic shape, but may be applied to all polygonally shaped milling inserts that can be mounted at a setting angle of 45° in the milling cutter head.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A face-milling insert, comprising:
   a chip-removing main cutting edge adjacent to a first clearance surface; and
   a surface-wiping secondary edge adjacent to a second clearance surface, the main cutting edge forming an angle of 45° with an imaginary straight line in the extension of the secondary edge, wherein
   adjacent to a third clearance surface, an intermediate cutting edge is formed between the main cutting edge and the secondary edge, the intermediate cutting edge being shorter than the main cutting edge, and forming an angle smaller than 45° with the extension line, the intermediate cutting edge transforming into the adjacent edges via first and second arched part edges adjacent to convex clearance surfaces; and
   the first, arched part edge, which forms a transition between the secondary edge and the intermediate cutting edge, has a radius that is smaller than 1 mm and that is smaller than a radius of the second, arched part edge.

2. The face-milling insert according to claim 1, wherein the angle of the intermediate cutting edge to the extension line is at most 40°.

3. The face-milling insert according to claim 1, wherein the angle of the intermediate cutting edge to the extension line is at least 20°.

4. The face-milling insert according to claim 1, wherein the length of the intermediate cutting edge is at most 10% of the length of the main cutting edge.

5. The face-milling insert according to claim 1, wherein the length of the intermediate cutting edge is at most 0.5 mm.

6. The face-milling insert according to claim 5, wherein the radius of the second part edge is at most 2 mm.

* * * * *